(12) United States Patent
Loce et al.

(10) Patent No.: US 7,565,015 B2
(45) Date of Patent: *Jul. 21, 2009

(54) EDGE PIXEL IDENTIFICATION

(75) Inventors: Robert P Loce, Webster, NY (US); Beilei Xu, Penfield, NY (US); Stuart A. Schweid, Pittsford, NY (US); Son H Nguyen, Rolling Hills Estates, CA (US); Michael Branciforte, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 706 days.

This patent is subject to a terminal disclaimer.

(21) Appl. No.: 11/317,818

(22) Filed: Dec. 23, 2005

(65) Prior Publication Data

US 2007/0147684 A1 Jun. 28, 2007

(51) Int. Cl.
*G06K 9/48* (2006.01)
*G06K 9/40* (2006.01)

(52) U.S. Cl. ........................ 382/199; 382/266

(58) Field of Classification Search ................. 382/190, 382/197, 199, 242, 266–269; 345/611
See application file for complete search history.

(56) References Cited

U.S. PATENT DOCUMENTS

| | | | |
|---|---|---|---|
| 5,790,701 A * | 8/1998 | Shijo et al. | 382/205 |
| 6,144,461 A | 11/2000 | Crean et al. | |
| 6,167,166 A | 12/2000 | Loce et al. | |
| 6,181,438 B1 | 1/2001 | Bracco et al. | |
| 6,243,499 B1 | 6/2001 | Loce et al. | |
| 6,606,420 B1 | 8/2003 | Loce et al. | |
| 6,763,141 B2 | 7/2004 | Xu et al. | |
| 6,775,410 B1 | 8/2004 | Loce et al. | |
| 7,280,121 B2 * | 10/2007 | Nakahashi et al. | 345/611 |
| 2005/0129328 A1 | 6/2005 | Saber et al. | |

OTHER PUBLICATIONS

Robert P. Loce et al., U.S. Appl. No. 11/317,782, filed simultaneously herewith, entitled "Anti-Aliased Tagging Using Look-Up Table Edge Pixel Identification".
Robert P. Loce et al., U.S. Appl. No. 11/317,427, filed simultaneously herewith, entitled "Corner Sharpening Using Look-Up Table Edge Pixel Identification".
Robert P. Loce et al., U.S. Appl. No. 11/318,131, filed simultaneously herewith, entitled "Tinted Edge Enhancement Using Look-Up Table Edge Pixel Identification".
Purdum et al., U.S. Appl. No. 10/973,725, filed Oct. 26, 2004, entitled "Tinted Edge Enhancement Using Harmonic Halftones for the Boundary Pixels".
Richard Rubinstein, *Digital Typography: An Introduction to Type and Composition for Computer System Design*, Addison-Wesley Publishing Company, Reading, MA, Copyright 1988, pp. 78-80.

* cited by examiner

*Primary Examiner*—Daniel G Mariam
(74) *Attorney, Agent, or Firm*—Fay Sharpe LLP

(57) ABSTRACT

The teachings provided herein disclose a method for the identification of edge pixels within a digital image. The method operates by generating edge-state codes for a plurality of pairs of neighboring vectors of pixels within a given observation window, and generating an edge-identification code from the plurality of edge-state codes using a look-up table. The edge identification provides information that can be used for subsequent treatments such as rendering anti-aliased pixels, selecting preferred halftoning and tone reproduction for edge pixels, corner sharpening, and object recognition and segmentation.

21 Claims, 7 Drawing Sheets

EDGE PIXEL IDENTIFICATION

CROSS-REFERENCE TO COPENDING APPLICATIONS

Attention is directed to copending applications filed concurrently herewith: U.S. application Ser. No. 11/317,782, now U.S. Publication No. US2007-0146386-A1, entitled "ANTI-ALIASED TAGGING USING LOOK-UP TABLE EDGE PIXEL IDENTIFICATION"; U.S. application Ser. No. 11/317,427, now U.S. Publication No. US2007-0147699-A1, entitled "CORNER SHARPENING USING LOOK-UP TABLE EDGE PIXEL IDENTIFICATION"; and U.S. application Ser. No. 11/318,131, U.S. Publication No. US2007-0146796-A1, entitled "TINTED EDGE ENHANCEMENT USING LOOK-UP TABLE EDGE PIXEL IDENTIFICATION". The disclosure found in each of these copending applications is hereby incorporated by reference in its entirety.

CROSS-REFERENCE TO RELATED APPLICATIONS

Cross reference is made to the following applications, the disclosures of each of which are totally incorporated by reference herein: US Publication No. 20050/129328, entitled "CORNER SHARPENING OF TEXT AND LINE ART IN A SUPER RESOLUTION ANTI-ALIASING IMAGE PATH," to inventors E. Saber, R. Loce, filed Dec. 15, 2003; and U.S. application Ser. No. 10/973,725, entitled "TINTED EDGE ENHANCEMENT USING HARMONIC HALFTONES FOR THE BOUNDARY PIXELS", to inventors C. Purdum, R. Loce, B. Xu, D. Lieberman, M. Gwaltney, J. McEvain, C. Hains, filed Oct. 26, 2004. The appropriate components and processes of the above co-pending application may be selected for the invention of the present application in embodiments thereof.

BACKGROUND AND SUMMARY

This disclosure relates generally to digital processing of image data. This disclosure relates more specifically to edge detection in digital image processing. An edge within an image is a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

Two key properties of an edge are strength and orientation. Edge strength is a measure of the contrast of an edge. A black typographic character on a white background produces stronger edges than a gray character on a white background. Edge orientation can be described by a variety of measures, such as angle quantified in degrees or by classes such as vertical, horizontal, and diagonal.

Other attributes of edges are also useful to image analysis and image processing. For instance, classification of combined edges, such as corners, has been used in object recognition and in image enhancement applications. Edge thickness is a measure that provides information on the breadth of a local contrast change and can indicate a degree of blur in an image, see for example: U.S. Pat. No. 6,763,141, entitled "ESTIMATION OF LOCAL DEFOCUS DISTANCE AND GEOMETRIC DISTORTION BASED ON SCANNED IMAGE FEATURES," to inventors B. Xu, R. Loce, which is hereby incorporated in its entirety for its teachings. Inner edges and outer edges refer to regions just inside of or just outside of a given object, respectively, and have been used in applications such as character stroke thinning and thickening. The presence or absence of an edge is an edge-related property that has been used in applications such as image classification and recognition. Distance from an edge is also an edge-related property that has been used in image enhancement applications.

Edge detection in digital image processing typically employs a collection of methods used to identify or modify edge pixels or indicate properties of edges and edge pixels within an image. Edge detection methods are sometimes referred to simply as edge detectors. There are numerous applications of edge detectors in digital image processing for electronic printing. For example, identification of corner pixels has been used to sharpen corners within an image, see: U.S. Pat. No. 6,775,410, entitled "IMAGE PROCESSING METHOD FOR SHARPENING CORNERS OF TEXT AND LINE ART," to inventors R. Loce, X. Zhu, C. Cuciurean-Zapan. Identification of inner and outer border pixels has been used to control the apparent darkness of character strokes, see: U.S. Pat. No. 6,606,420, entitled "METHOD AND APPARATUS FOR DIGITAL IMAGE DARKNESS CONTROL IN SATURATED IMAGE STRUCTURES", to Loce et al; and U.S. Pat. No. 6,181,438, entitled "METHOD AND APPARATUS FOR DIGITAL IMAGE DARKNESS CONTROL USING QUANTIZED FRACTIONAL PIXELS," to Bracco et al. Also identification of anti-aliased pixels has been used for preferred rendering of those same pixels, see: U.S. Pat. No. 6,243,499, entitled "TAGGING OF ANTI-ALIASED IMAGES," to Loce, et al.; U.S. Pat. No. 6,144,461, entitled "METHOD FOR GENERATING RENDERING TAGS TO FACILITATE THE PRINTING OF ANTIALIASED IMAGES," to Crean et al.; and U.S. Pat. No. 6,167,166, entitled "METHOD TO ENABLE THE RECOGNITION AND RENDERING OF ANTIALIASED IMAGES," to Loce et al. All of the above cited are hereby incorporated by reference in their entirety for their teachings.

Edge detectors typically operate using a convolution mask and are based on differential operations. Differentials for edge/line detection are used to define color or brightness changes of pixels and their change directions. If there is an abrupt change of brightness within a short interval within an image, it means that within that interval there is high probability that an edge exists. One example of a convolution-based edge detector is the Roberts edge detector, which employs the square root of the magnitude squared of the convolution with the Robert's row and column edge detectors. The Prewitt edge detector employs the Prewitt compass gradient filters and returns the result for the largest filter response. The Sobel edge detector operates using convolutions with row and column edge gradient masks. The Marr-Hildreth edge detector performs two convolutions with a Laplacian of Gaussians and then detects zero crossings. The Kirsch edge detector performs convolution with eight masks that calculate gradient.

As indicated above, common edge detection methods employ a convolution-type computing architecture, usually with fixed coefficients. In the field of image processing, and in particular, for image processing in anticipation of electronic printing, the edge detection needs are numerous and varied. Further, image processing for electronic printing often requires that any processing method operate "real-time," within a small number of fixed clock cycles, thereby excluding more complicated methods as too computationally intensive. What is needed is an edge detection method with a computing architecture that is more readily adapted to a wide variety of edge detection needs than are the common convolution-based methods, and which can be readily adapted to real-time applications.

Disclosed in embodiments herein is a method for processing a digital image to identify edge pixels within the digital image. The method comprises selecting a target pixel location within the digital image; observing a set of pixels within a pixel observation window superimposed on the digital image, relative to the target pixel location; generating edge-state codes for a plurality of pairs of neighboring vectors of pixels within the pixel observation window; and generating edge-identification codes from the plurality of edge-state codes using at least one look-up table so as to thereby identify edge pixels.

Further disclosed in embodiments herein is a method for producing edge identification codes from continuous tone digital image data. The method comprises selecting a target pixel location within the continuous tone digital image; observing a set of pixels within a pixel observation window superimposed on the continuous tone digital image relative to the target pixel location; generating sums of weighted pixels values, where the sums are taken over first-orientation vectors of pixels that run through the observation window; generating sum-to-sum differences for neighboring pairs of said first-orientation vectors of pixels; generating edge-state codes for each pair of the neighboring first-orientation vectors of pixels by using one or more bits to encode a magnitude and one bit to encode a sign; and generating a first-orientation edge identification code by using a plurality of said encoded edge-state codes, where the bits of the edge-state codes are combined to form an index that addresses a first-orientation look-up table that maps multiple encoded edge states to a first-orientation edge identification code.

Further disclosed in embodiments herein is a method for producing edge identification codes from binary digital image data. The method comprises selecting a target pixel location within the binary digital image; observing a set of pixels within a pixel observation window superimposed on the binary digital image relative to the target pixel location; generating sums of weighted pixels values, where the sums are taken over first-orientation vectors of pixels that run through the observation window; generating sum-to-sum differences for neighboring pairs of said first-orientation vectors of pixels; generating edge-state codes for each pair of the neighboring first-orientation vectors of pixels by using one or more bits to encode a magnitude and one bit to encode a sign; and generating a first-orientation edge identification code by using a plurality of said encoded edge-state codes, where the bits of the edge-state codes are combined to form an index that addresses a first-orientation look-up table that maps multiple encoded edge states to a first-orientation edge identification code.

DETAILED DESCRIPTION

Figure 1:
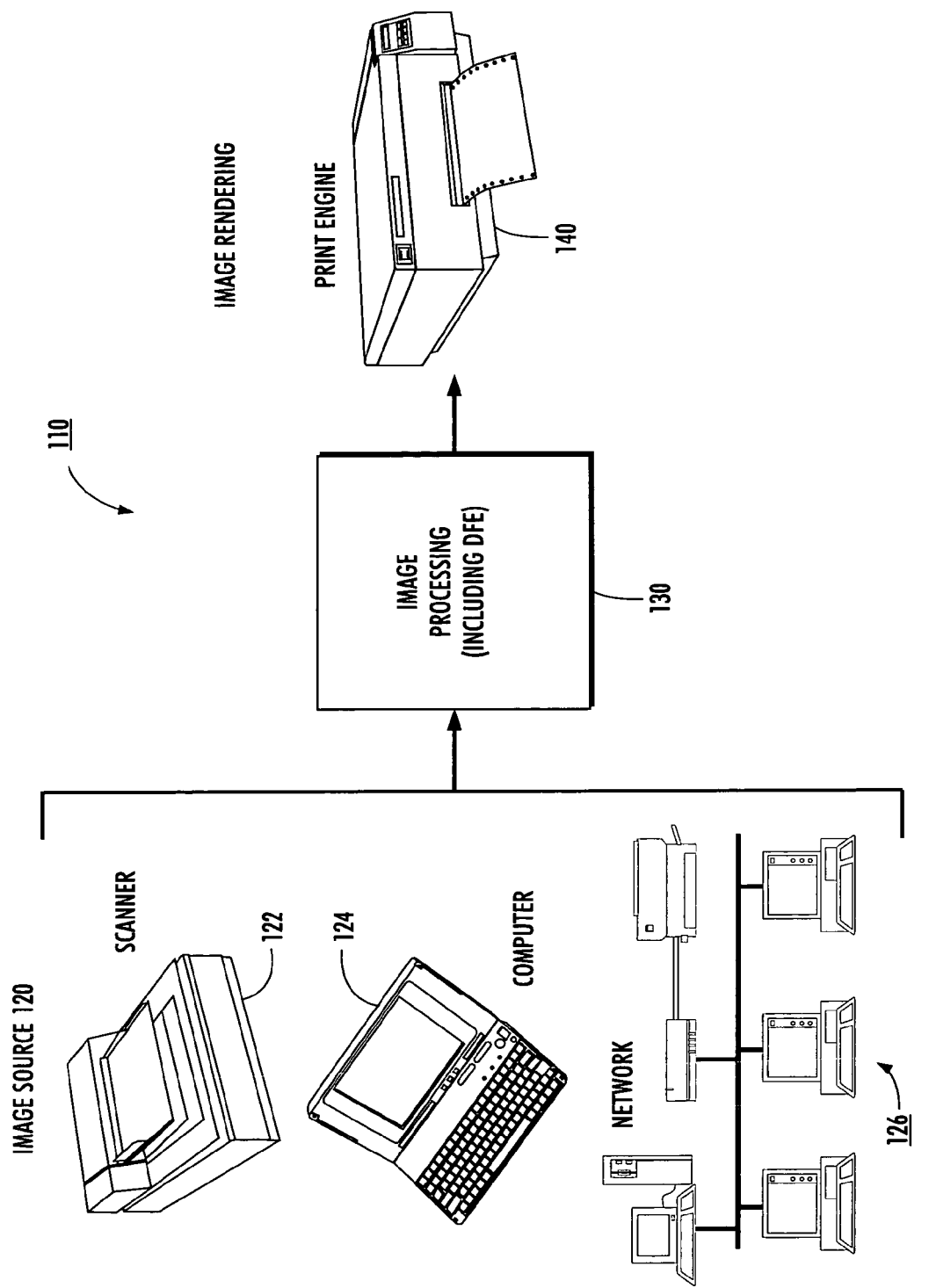
FIG. 1 is a general representation of a suitable system-level embodiment for one or more aspects of the teachings presented herein.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is considered to be in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, where each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Turning now to FIG. 1, depicted therein is an embodiment of a digital imaging system suitable for one or more aspects of the present invention. In the system 110, image source 120 is used to generate image data that is supplied to an image processing system 130, and which produces output data for rendering by print engine 140. Image source 120 may include scanner 122, computer 124, network 126 or any similar or equivalent image input terminal. On the output end printer engine 140 is preferably a xerographic engine however print engine 140 may include such equivalent print technology alternatives as Wax, ink jet, etc. The teachings presented herein are directed toward aspects of image processor 130 depicted in FIG. 1. In particular, the intention of the teachings presented herein is to identify, and process accordingly, edge pixels within a digital image. It will be appreciated by those skilled in the art that the rendering of an image into a printable or displayable output format may be accomplished at any of a number of locations, which herein is provided for in but one example, as only occurring within the image processing system 130 or within in the print engine 140.

Figure 2:
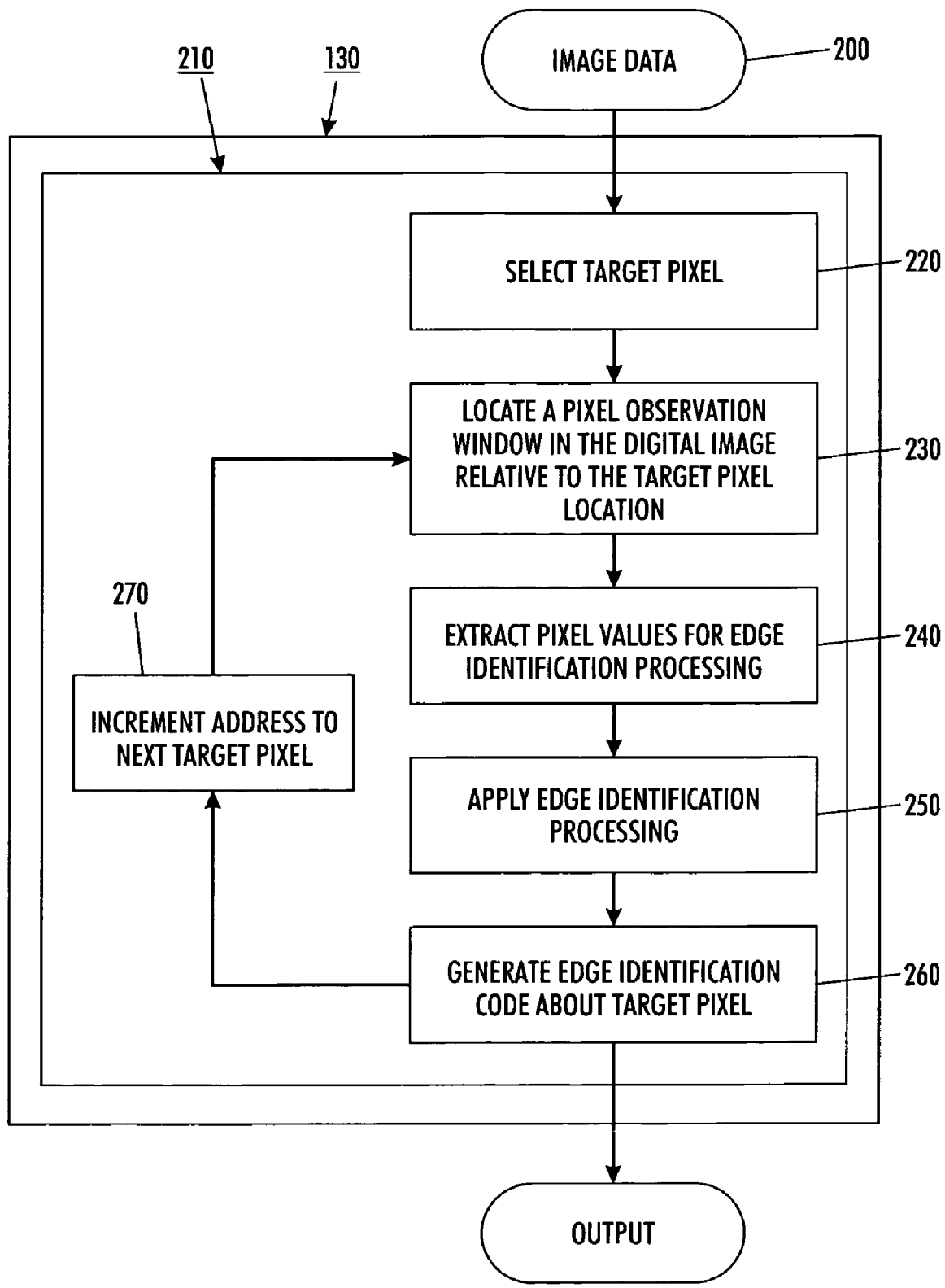
FIG. 2 depicts a flow chart of an image processing system containing an embodiment of the teachings presented herein.

Referring now to FIG. 2, shown therein is a diagram depicting the data flow in an example embodiment. Image processing system 130 receives raw (unprocessed) image input image data 200. Image processing system 130 includes an edge identification processor 210, and may contain other image processing operations as well. Within the edge identification processor 210 a target pixel is selected 220 and an observation window of pixels is located about the target pixel 230. In one embodiment, this window is 5×5 pixels in dimension with the center pixel as the window origin, where the origin pixel is used to locate the window on the target pixel. However, a smaller window, such as a 3×3, or in the alternative a larger size window, or even a window of a non-square shape, is well within the contemplation of the present disclosure. This window is stepped through the image pixel data. In one embodiment the origin pixel is stepped to target pixels from top to bottom and from left to right through all address locations within an image. Typically all pixels within the input image become target pixels in a successive manner. At each location the pixel values are extracted from within the window as indicated in step 240.

Figure 3:
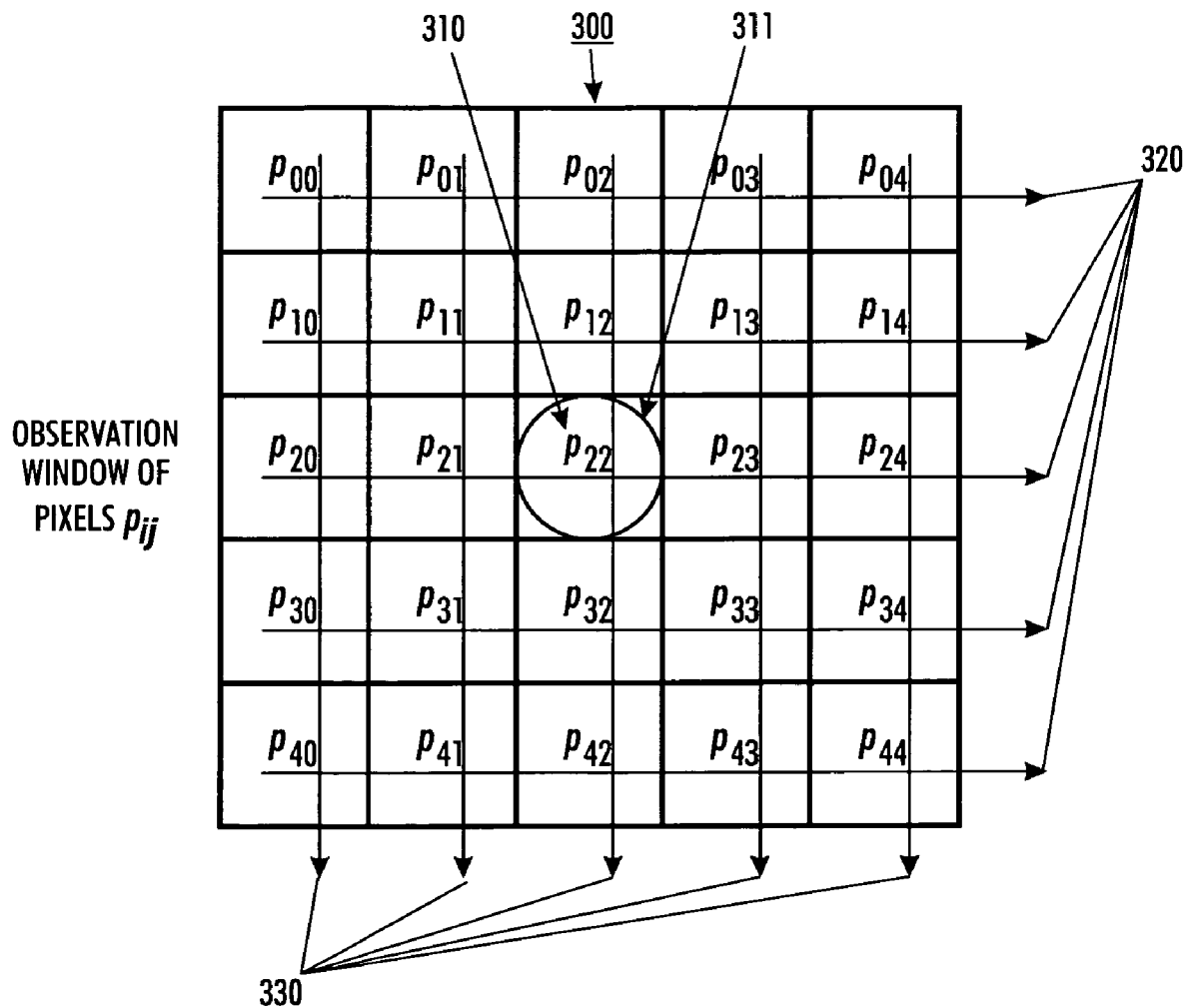
FIG. 3 schematically depicts an embodiment of an observation window.

FIG. 3 depicts a 5×5 window 300 with a center pixel 310 as the window origin ($p_{22}$), which is used in locating the window 300 about a given target pixel. The pixel values in the window are each denoted by some $p_{ij}$, where the subscripts i and j denote row and column indices respectively, and range from 0 to 4 for the 5×5 window. A circle 311 has been added as a quick visual indicator of the origin pixel location within the window. It is this origin pixel 310 which is typically stepped across all pixel address locations as each pixel location in turn becomes a target pixel. For each target pixel address, the pixel values within the window 300 are applied to the edge identification processing as described above and below in the discussion of FIG. 2. While the discussion here of FIGS. 2 and 3 describes the edge identification process as a serial operation, where successive target pixels are defined and processed, it will also be recognized by one skilled in the art that a parallel process can be employed where multiple target pixels could be processed simultaneously using multiple windows and multiple edge identification processors. The bitmap image data may be divided-up in any number of ways in order to achieve this parallel processing of the image data. One approach for example would be using segmentation to divide the image data into text and graphics. Another approach for color images would be to separate out the color planes and process each individually. There are many other approaches that will be apparent to those skilled in the art.

Returning now to FIG. 2, in step 250 the extracted pixel values are used as input into the edge identification processing means 210. There are alternative computing architectures that may be employed here, such as parallel, serial, or some combination of parallel and serial operations, as will be evident to those skilled in the art. Irregardless of how the computing architecture is configured, the operations are low complexity arithmetic and look-up table operations applied to the extracted pixel values. The edge identification performed in step 250 is encoded to an edge identification code in step 260. Finally, the increment block 270 restarts the process loop over at the next target pixel address until all target pixels have been processed.

Figure 4:
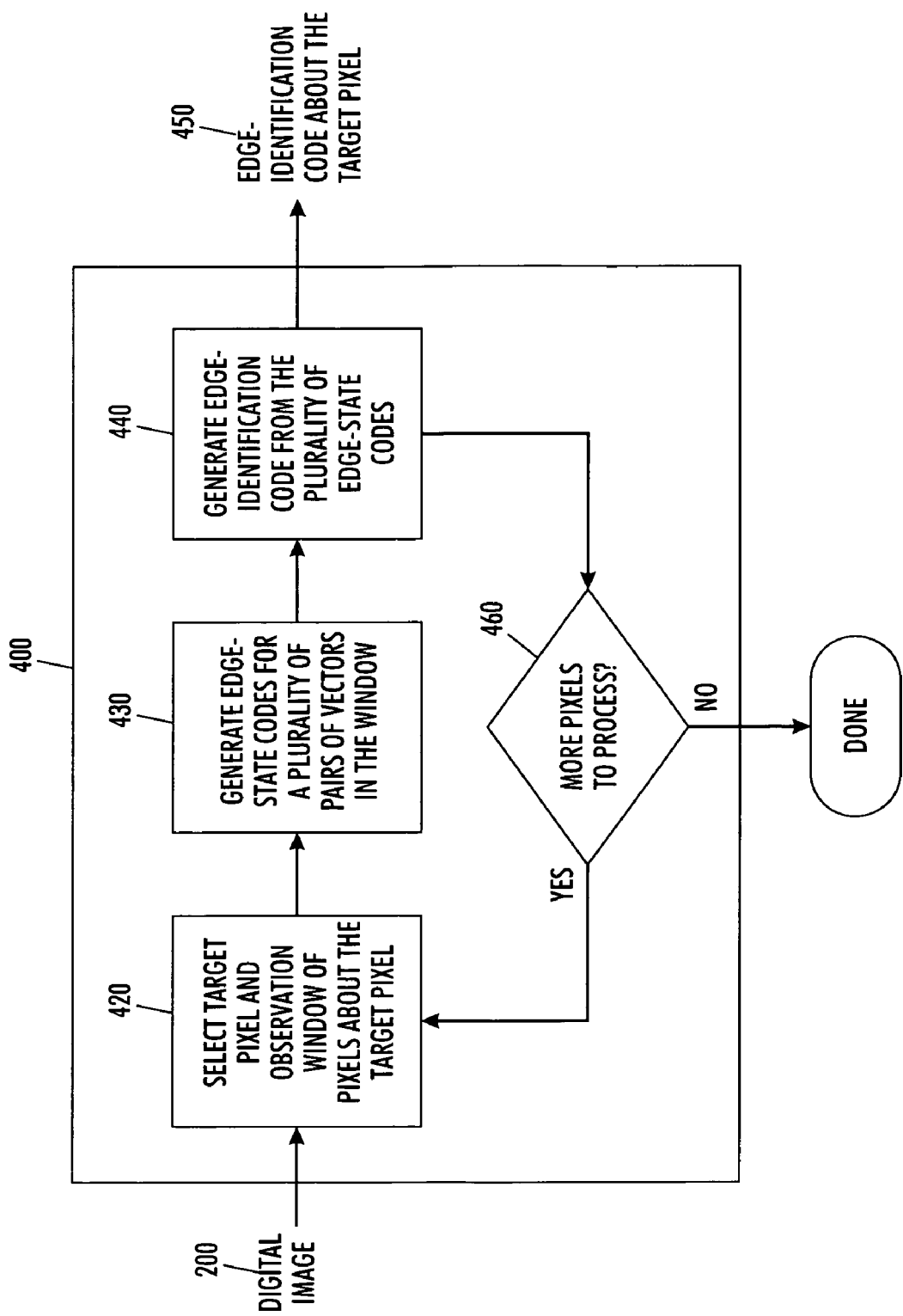
FIG. 4 is a generalized data flow representation of one embodiment of the teachings presented herein.

FIG. 4 depicts a flowchart wherein a digital image data 200 is input to edge-identification process 400. A target pixel is selected and an observation window of pixels is observed about the target pixel 420. Edge-state codes are generated for a plurality of pairs of vectors of pixels that run through the observation window 430. FIG. 3 depicts one arrangement of vectors of pixels that run through the observation window in horizontal 320 and vertical 330 orientations. Vectors of other orientations, such as diagonal, may be employed in generating edge-state codes. An edge-identification code is generated from the plurality of edge state codes 440 to produce an edge-identification code about the target pixel 450. If more pixels are to be processed, the edge identification process returns to step 420.

Figure 5:
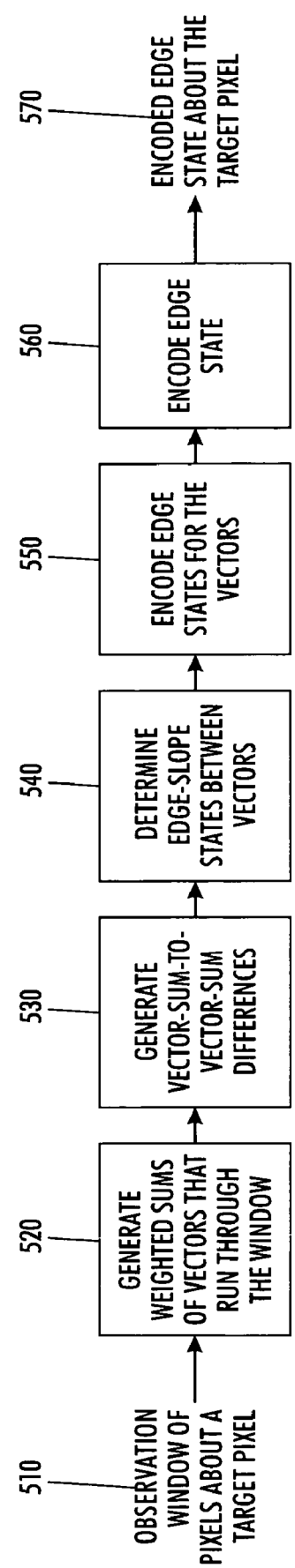
FIG. 5 is a generalized data flow representation of another embodiment of the teachings presented herein.

FIG. 5 depicts how an observation window of pixels 300 about a target pixel 310 is input 510 to step 520 where a plurality of sums of weighted pixel values are generated, where each sum is taken over a vector of pixels that run through the observation window. The weights can be applied as multiplicative coefficients, or another means, such as by an additive or subtractive operation. Step 530 receives the weighted sums of vectors of pixels, and generates vector-sum-to-vector-sum differences between pairs of neighboring vectors. For instance, when employing horizontal vectors 320 for pixel observation window rows 0 through 4, differences can be generated for the respective sums of row 0 and 1, the respective sums of rows 1 and 2, the respective sums of rows 2 and 3, and the respective sums of rows 3 and 4. Alternatively, differences may be taken between neighboring vectors other than the nearest neighboring vectors. For instance, differences can be generated for the respective sums of row 0 and 2, the respective sums of rows 1 and 3, and the respective sums of rows 2 and 4.

The vector-sum-to-vector-sum differences are input to step 540 where an "edge-slope state" between each of the plurality of vector pairs is determined. "Edge-slope state" refers to the presence of an edge and the orientation of the edge (rising or falling) between the vectors of pixels. Large differences between the sums indicate the presence of an edge, while positive and negative signs to the difference indicate a rising or falling edge, respectively. Step 550 receives the plurality of edge-slope states and encodes those states as a plurality of respective bit patterns. For instance, the presence or strength of an edge between two vectors of pixels may be encoded in some number of bits, and the sign, or orientation, of the edge may be encoded by another bit. For applications that do not require high precision definition of edges, it may be sufficient to encode the presence and strength of an edge in 1 bit, i.e., an edge is significantly present or an edge is not significantly present. For other applications requiring finer identification of edges, more than one bit may be used to define the presence and strength of an edge.

The plurality of edge states for the vectors generated in step 550 are input to an encoding process 560 that generates a code for the edge state of the plurality of vectors of the window. In other words, step 560 will receive a plurality of bit patterns, i.e., edge-state codes for the vector differences, and may employ a look-up table to map those bit patterns, to a bit pattern 570 representing a general state of the edges for the plurality of vectors examined. For instance, an edge-state code about a target pixel may indicate rising and falling edges for multiple locations within the pixel observation window.

Figure 6:
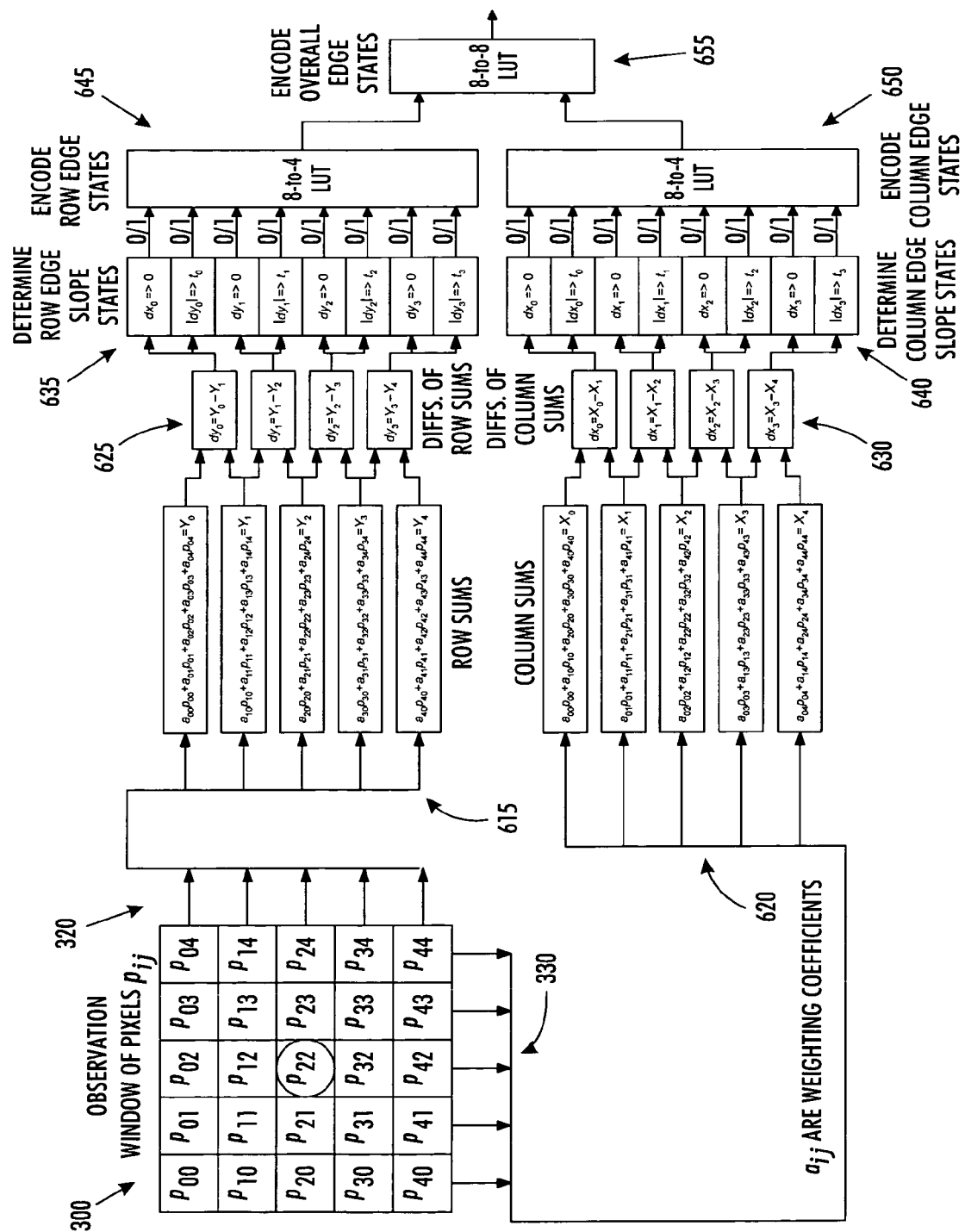
FIG. 6 Schematic of an embodiment of the computing architecture of an embodiment of the teachings presented herein.

FIG. 6 depicts a detailed high-level block diagram schematic for one embodiment consistent with the teachings provided herein. An observation window of pixels 300 is shown with the window origin pixel denoted $p_{22}$. Pixels aligned in a particular orientation are used to form a plurality of vectors of pixels associated with that orientation. In FIG. 6, rows of pixels in the observation window are used to form respective horizontal vectors of pixels 320 and columns of pixels are used to form respective vertical vectors of pixels 330. As will be evident to those skilled in the art, other or additional vectors of pixels of other orientations may be formed from pixels in the observation window. For example, vectors of pixels may be formed from pixels aligned at some angle, such as ±45°.

In a next step, the plurality of vectors of pixels are received, and weighted sums of pixels within each vector are generated. FIG. 6 illustrates multiplicative weighting with weights $a_{ij}$ applied to the pixel values within a vector, whereupon the weighted values are summed. These weights $a_{ij}$ can be selected and optimized for particular applications. For instance, in the presence of background noise in the image, the weights may be made uniform (e.g., all 1's) in an attempt to suppress the effect of noise on the edge identification. Conversely, a low noise setting or in situations where images possess very small edge features it may be required to utilize larger values of weights $a_{ij}$ near the center of the window and smaller values at greater distance from the center. The values could decrease from a center value with a trend such as linear or Gaussian. The weighting and summing process is performed for each respective vector of each orientation. Summing blocks 615 in the present embodiment perform the summing process for the horizontal vectors and Summing blocks 620 perform the summing process for the vertical vectors. A plurality of sums are produced, denote by $Y_i$ for the horizontal vectors and $X_i$ for the vertical vectors, where i=0 to 4 in the presently illustrated embodiment.

In some computing architectures it can be advantageous to reduce the number of bits in the weighting and summing process. For instance, when using 8-bit numbers possessing range 0 to 255, and using multiplicative coefficients defined by 8 bits, the resultant product may require 16-bit representation. A sum over the vector of pixels would require an even higher bit representation. Using such a large number of bits to represent results of these intermediate operations can be very costly for real-time, high-speed applications. Further, typical edge identification tasks do not require such a great bit depth. It has been found that it is advantageous as to both cost and speed to reduce the bit depth of these operations. For instance, the weighted sums can be limited to 8 bits of quantization resolution.

In a subsequent step, the weighted vector sums are received and differences are formed between pairs of sums of neighboring vectors of a particular orientation. In FIG. 6, computational blocks 625 and 630 perform differencing for nearest-neighbor rows and nearest-neighbor columns, respectively, to form a plurality of vector-sum differences for each orientation. In FIG. 6, the differences are denoted as $dy_i$ for column vectors and $dx_i$ for row vectors, where i=0 to 3. As stated above, the difference step may not be restricted to nearest neighbors, and may be performed between neighboring vectors that are separated by one or more vectors.

In a further step, a plurality of edge-slope states between the vectors are generated using respective differences between vector sums as input. Determination of the edge-slope states depicted in FIG. 6 as performed by computational blocks 635 and 640 tests the magnitude and sign of each difference. For each difference, the significance of the edge is determined by comparing the magnitude of that difference to a threshold. A 1-bit output (states 0 or 1) indicates that the difference is at or above a threshold, thereby indicating significance, or is not at or above the threshold, thereby indicating lack of significance. The thresholds are depicted in FIG. 6 as $t_i$ where i=0 to 3. These thresholds may be set over a broad range of value and made the same or different for different vector pairs or different vector orientations depending on a particular application. For instance, thresholds may be set low (e.g., 16) when attempting to identify an edge of a gray object, such as a gray typographic character, and may be set high (e.g., 128) when attempting to identify a high contrast edge, like the corner of a black typographic character on a white background. The sign of each difference is also tested and the result is rendered to a 1-bit form indicating a positive or negative slope, where slope of zero could be classified either positive or negative due to the lack of significance of the edge. The edge-slope states are determined for row and column vectors, by computational blocks 635 and 640, respectively. A plurality of edge-slope states are determined for each orientation.

An edge encoding block for a given particular orientation receives the edge-slope state and generates a code for the edge state of that orientation. In FIG. 6, encoding blocks 645 and 650 provide the encoding of edge states for horizontal and vertical orientations, respectively. The encoding may, in one embodiment, be performed via a Look-Up Table (LUT) that maps the bits of the plurality of edge-slope states for an orientation to an orientation edge-state code. The FIG. 6 embodiment illustrates the use of an 8-bit-to-4-bit LUT for that encoding purpose, but it is within the scope of the teachings disclosed herein to allow other bit mapping relationships. For instance, use of more vectors or high quantization of vector-sum differences could require more than 8 bits as input and 4 bits output. If only one orientation is employed, this orientation edge-state code is the resulting edge state code of the process. However, if more than one orientation of vectors is employed, the multiple orientation edge-state codes are mapped through an additional encoding process block 655 to arrive at output edge-state code. This encoding may also be performed using a LUT process.

An example of a LUT for encoding edge states is given in Table 1. The codes are shown in the table as hexadecimal numbers. In Table 1, the notation used is in reference to horizontal vectors, but concepts therein embodied by the table are more general as will be understood by those skilled in the art. For instance, it is straightforward to interpret the inputs to be from an orientation other than horizontal, such as vertical. Further, the table can be considered an example of a means to produce an orientation edge-state code, or an output edge-state code if only one orientation is to be employed. The notation used as edge state descriptions in Table 1 is explained in Table 2.

TABLE 1

Row Edge Encoding

Edge Slope States

| dY0>0 1 means falling edge | abs(dY0)>T 1 means strong edge | dY1>0 1 means falling edge | abs(dY1)>T 1 means strong edge | dY2>0 1 means falling edge | abs(dY2)>T 1 means strong edge | dY3>0 1 means falling edge | abs(dY3)>T 1 means strong edge | Edge State Description | Edge State Code |
|---|---|---|---|---|---|---|---|---|---|
| 0 | 0 | 0 | 0 | 0 | 0 | 0 | 0 | Flat | 0x0E |
| 0 | 0 | 0 | 0 | 0 | 0 | 0 | 1 | ↑FB | 0x00 |

TABLE 1-continued

Row Edge Encoding

| dY0>0 1 means falling edge | abs(dY0)>T 1 means strong edge | dY1>0 1 means falling edge | abs(dY1)>T 1 means strong edge | dY2>0 1 means falling edge | abs(dY2)>T 1 means strong edge | dY3>0 1 means falling edge | abs(dY3)>T 1 means strong edge | Edge State Description | Edge State Code |
|---|---|---|---|---|---|---|---|---|---|
| 0 | 0 | 0 | 0 | 0 | 0 | 1 | 0 | Flat | 0x0E |
| 0 | 0 | 0 | 0 | 0 | 0 | 1 | 1 | ↓FB | 0x01 |
| 0 | 0 | 0 | 0 | 0 | 1 | 0 | 0 | ↑B | 0x04 |
| 0 | 0 | 0 | 0 | 0 | 1 | 0 | 1 | ↑B↑FB | 0x02 |
| 0 | 0 | 0 | 0 | 0 | 1 | 1 | 0 | ↑B | 0x04 |
| 0 | 0 | 0 | 0 | 0 | 1 | 1 | 1 | ↑B↓FB | 0x0F |
| 0 | 0 | 0 | 0 | 1 | 0 | 0 | 0 | Flat | 0x0E |
| 0 | 0 | 0 | 0 | 1 | 0 | 0 | 1 | ↑FB | 0x00 |
| 0 | 0 | 0 | 0 | 1 | 0 | 1 | 0 | Flat | 0x0E |
| 0 | 0 | 0 | 0 | 1 | 0 | 1 | 1 | ↓FB | 0x01 |
| 0 | 0 | 0 | 0 | 1 | 1 | 0 | 0 | ↓B | 0x05 |
| 0 | 0 | 0 | 0 | 1 | 1 | 0 | 1 | ↓B↑FB | 0x0F |
| 0 | 0 | 0 | 0 | 1 | 1 | 1 | 0 | ↓B | 0x05 |
| 0 | 0 | 0 | 0 | 1 | 1 | 1 | 1 | ↓B↓FB | 0x03 |
| 0 | 0 | 0 | 1 | 0 | 0 | 0 | 0 | ↑T | 0x08 |
| 0 | 0 | 0 | 1 | 0 | 0 | 0 | 1 | ↑T↑FB | 0x0F |
| 0 | 0 | 0 | 1 | 0 | 0 | 1 | 0 | ↑T | 0x08 |
| 0 | 0 | 0 | 1 | 0 | 0 | 1 | 1 | ↑T↓FB | 0x0F |
| 0 | 0 | 0 | 1 | 0 | 1 | 0 | 0 | ↑T↑B | 0x06 |
| 0 | 0 | 0 | 1 | 0 | 1 | 0 | 1 | ↑T↑B↑FB | 0x0F |
| 0 | 0 | 0 | 1 | 0 | 1 | 1 | 0 | ↑T↑B | 0x06 |
| 0 | 0 | 0 | 1 | 0 | 1 | 1 | 1 | ↑T↑B↓FB | 0x0F |
| 0 | 0 | 0 | 1 | 1 | 0 | 0 | 0 | ↑T | 0x08 |
| 0 | 0 | 0 | 1 | 1 | 0 | 0 | 1 | ↑T↑FB | 0x0F |
| 0 | 0 | 0 | 1 | 1 | 0 | 1 | 0 | ↑T | 0x08 |
| 0 | 0 | 0 | 1 | 1 | 0 | 1 | 1 | ↑T↓FB | 0x0F |
| 0 | 0 | 0 | 1 | 1 | 1 | 0 | 0 | ↑T↓B | 0x0F |
| 0 | 0 | 0 | 1 | 1 | 1 | 0 | 1 | ↑T↓B↑FB | 0x0F |
| 0 | 0 | 0 | 1 | 1 | 1 | 1 | 0 | ↑T↓B | 0x0F |
| 0 | 0 | 0 | 1 | 1 | 1 | 1 | 1 | ↑T↓B↓FB | 0x0F |
| 0 | 0 | 1 | 0 | 0 | 0 | 0 | 0 | Flat | 0x0E |
| 0 | 0 | 1 | 0 | 0 | 0 | 0 | 1 | ↑FB | 0x00 |
| 0 | 0 | 1 | 0 | 0 | 0 | 1 | 0 | Flat | 0x0E |
| 0 | 0 | 1 | 0 | 0 | 0 | 1 | 1 | ↓FB | 0x01 |
| 0 | 0 | 1 | 0 | 0 | 1 | 0 | 0 | ↑B | 0x04 |
| 0 | 0 | 1 | 0 | 0 | 1 | 0 | 1 | ↑B↑FB | 0x02 |
| 0 | 0 | 1 | 0 | 0 | 1 | 1 | 0 | ↑B | 0x04 |
| 0 | 0 | 1 | 0 | 0 | 1 | 1 | 1 | ↑B↓FB | 0x0F |
| 0 | 0 | 1 | 0 | 1 | 0 | 0 | 0 | Flat | 0x0E |
| 0 | 0 | 1 | 0 | 1 | 0 | 0 | 1 | ↑FB | 0x00 |
| 0 | 0 | 1 | 0 | 1 | 0 | 1 | 0 | Flat | 0x0E |
| 0 | 0 | 1 | 0 | 1 | 0 | 1 | 1 | ↓FB | 0x01 |
| 0 | 0 | 1 | 0 | 1 | 1 | 0 | 0 | ↓B | 0x05 |
| 0 | 0 | 1 | 0 | 1 | 1 | 0 | 1 | ↓B↑FB | 0x0F |
| 0 | 0 | 1 | 0 | 1 | 1 | 1 | 0 | ↓B | 0x05 |
| 0 | 0 | 1 | 0 | 1 | 1 | 1 | 1 | ↓B↓FB | 0x03 |
| 0 | 0 | 1 | 1 | 0 | 0 | 0 | 0 | ↓T | 0x09 |
| 0 | 0 | 1 | 1 | 0 | 0 | 0 | 1 | ↓T↑FB | 0x0F |
| 0 | 0 | 1 | 1 | 0 | 0 | 1 | 0 | ↓T | 0x09 |
| 0 | 0 | 1 | 1 | 0 | 0 | 1 | 1 | ↓T↓FB | 0x0F |
| 0 | 0 | 1 | 1 | 0 | 1 | 0 | 0 | ↓T↑B | 0x0F |
| 0 | 0 | 1 | 1 | 0 | 1 | 0 | 1 | ↓T↑B↑FB | 0x0F |
| 0 | 0 | 1 | 1 | 0 | 1 | 1 | 0 | ↓T↑B | 0x0F |
| 0 | 0 | 1 | 1 | 0 | 1 | 1 | 1 | ↓T↑B↓FB | 0x0F |
| 0 | 0 | 1 | 1 | 1 | 0 | 0 | 0 | ↓T | 0x09 |
| 0 | 0 | 1 | 1 | 1 | 0 | 0 | 1 | ↓T↑FB | 0x0F |
| 0 | 0 | 1 | 1 | 1 | 0 | 1 | 0 | ↓T | 0x09 |
| 0 | 0 | 1 | 1 | 1 | 0 | 1 | 1 | ↓T↓FB | 0x0F |
| 0 | 0 | 1 | 1 | 1 | 1 | 0 | 0 | ↓T↓B | 0x07 |
| 0 | 0 | 1 | 1 | 1 | 1 | 0 | 1 | ↓T↓B↑FB | 0x0F |
| 0 | 0 | 1 | 1 | 1 | 1 | 1 | 0 | ↓T↓B | 0x07 |
| 0 | 0 | 1 | 1 | 1 | 1 | 1 | 1 | ↓T↓B↓FB | 0x0F |
| 0 | 1 | 0 | 0 | 0 | 0 | 0 | 0 | ↑FT | 0x0C |
| 0 | 1 | 0 | 0 | 0 | 0 | 0 | 1 | ↑FT↑FB | 0x0F |
| 0 | 1 | 0 | 0 | 0 | 0 | 1 | 0 | ↑FT | 0x0C |
| 0 | 1 | 0 | 0 | 0 | 0 | 1 | 1 | ↑FT↓FB | 0x0F |
| 0 | 1 | 0 | 0 | 0 | 1 | 0 | 0 | ↑FT↑B | 0x0F |
| 0 | 1 | 0 | 0 | 0 | 1 | 0 | 1 | ↑FT↑B↑FB | 0x0F |
| 0 | 1 | 0 | 0 | 0 | 1 | 1 | 0 | ↑FT↑B | 0x0F |

TABLE 1-continued

Row Edge Encoding

| dY0>0 1 means falling edge | abs(dY0)>T 1 means strong edge | dY1>0 1 means falling edge | abs(dY1)>T 1 means strong edge | dY2>0 1 means falling edge | abs(dY2)>T 1 means strong edge | dY3>0 1 means falling edge | abs(dY3)>T 1 means strong edge | Edge State Description | Edge State Code |
|---|---|---|---|---|---|---|---|---|---|
| 0 | 1 | 0 | 0 | 0 | 1 | 1 | 1 | ↑FT↑B↓FB | 0x0F |
| 0 | 1 | 0 | 0 | 1 | 0 | 0 | 0 | ↑FT | 0x0C |
| 0 | 1 | 0 | 0 | 1 | 0 | 0 | 1 | ↑FT↑FB | 0x0F |
| 0 | 1 | 0 | 0 | 1 | 0 | 1 | 0 | ↑FT | 0x0C |
| 0 | 1 | 0 | 0 | 1 | 0 | 1 | 1 | ↑FT↓FB | 0x0F |
| 0 | 1 | 0 | 0 | 1 | 1 | 0 | 0 | ↑FT↓B | 0x0F |
| 0 | 1 | 0 | 0 | 1 | 1 | 0 | 1 | ↑FT↓B↑FB | 0x0F |
| 0 | 1 | 0 | 0 | 1 | 1 | 1 | 0 | ↑FT↓B | 0x0F |
| 0 | 1 | 0 | 0 | 1 | 1 | 1 | 1 | ↑FT↓B↓FB | 0x0F |
| 0 | 1 | 0 | 1 | 0 | 0 | 0 | 0 | ↑FT↑T | 0x0A |
| 0 | 1 | 0 | 1 | 0 | 0 | 0 | 1 | ↑FT↑T↑FB | 0x0F |
| 0 | 1 | 0 | 1 | 0 | 0 | 1 | 0 | ↑FT↑T | 0x0A |
| 0 | 1 | 0 | 1 | 0 | 0 | 1 | 1 | ↑FT↑T↓FB | 0x0F |
| 0 | 1 | 0 | 1 | 0 | 1 | 0 | 0 | ↑FT↑T↑B | 0x0F |
| 0 | 1 | 0 | 1 | 0 | 1 | 0 | 1 | ↑FT↑T↑B↑FB | 0x0F |
| 0 | 1 | 0 | 1 | 0 | 1 | 1 | 0 | ↑FT↑T↑B | 0x0F |
| 0 | 1 | 0 | 1 | 0 | 1 | 1 | 1 | ↑↑FT↑T↑B↓FB | 0x0F |
| 0 | 1 | 0 | 1 | 1 | 0 | 0 | 0 | ↑FT↑T | 0x0A |
| 0 | 1 | 0 | 1 | 1 | 0 | 0 | 1 | ↑FT↑T↑FB | 0x0F |
| 0 | 1 | 0 | 1 | 1 | 0 | 1 | 0 | ↑FT↑T | 0x0A |
| 0 | 1 | 0 | 1 | 1 | 0 | 1 | 1 | ↑FT↑T↓FB | 0x0F |
| 0 | 1 | 0 | 1 | 1 | 1 | 0 | 0 | ↑FT↑T↓B | 0x0F |
| 0 | 1 | 0 | 1 | 1 | 1 | 0 | 1 | ↑FT↑T↓B↑FB | 0x0F |
| 0 | 1 | 0 | 1 | 1 | 1 | 1 | 0 | ↑FT↑T↓B | 0x0F |
| 0 | 1 | 0 | 1 | 1 | 1 | 1 | 1 | ↑FT↑T↓B↓FB | 0x0F |
| 0 | 1 | 1 | 0 | 0 | 0 | 0 | 0 | ↑FT | 0x0C |
| 0 | 1 | 1 | 0 | 0 | 0 | 0 | 1 | ↑FT↑FB | 0x0F |
| 0 | 1 | 1 | 0 | 0 | 0 | 1 | 0 | ↑FT | 0x0C |
| 0 | 1 | 1 | 0 | 0 | 0 | 1 | 1 | ↑FT↓FB | 0x0F |
| 0 | 1 | 1 | 0 | 0 | 1 | 0 | 0 | ↑FT↑B | 0x0F |
| 0 | 1 | 1 | 0 | 0 | 1 | 0 | 1 | ↑FT↑B↑FB | 0x0F |
| 0 | 1 | 1 | 0 | 0 | 1 | 1 | 0 | ↑FT↑B | 0x0F |
| 0 | 1 | 1 | 0 | 0 | 1 | 1 | 1 | ↑FT↑B↓FB | 0x0F |
| 0 | 1 | 1 | 0 | 1 | 0 | 0 | 0 | ↑FT | 0x0C |
| 0 | 1 | 1 | 0 | 1 | 0 | 0 | 1 | ↑FT↑FB | 0x0F |
| 0 | 1 | 1 | 0 | 1 | 0 | 1 | 0 | ↑FT | 0x0C |
| 0 | 1 | 1 | 0 | 1 | 0 | 1 | 1 | ↑FT↓FB | 0x0F |
| 0 | 1 | 1 | 0 | 1 | 1 | 0 | 0 | ↑FT↓B | 0x0F |
| 0 | 1 | 1 | 0 | 1 | 1 | 0 | 1 | ↑FT↓B↑FB | 0x0F |
| 0 | 1 | 1 | 0 | 1 | 1 | 1 | 0 | ↑FT↓B | 0x0F |
| 0 | 1 | 1 | 0 | 1 | 1 | 1 | 1 | ↑FT↓B↓FB | 0x0F |
| 0 | 1 | 1 | 1 | 0 | 0 | 0 | 0 | ↑FT↓T | 0x0F |
| 0 | 1 | 1 | 1 | 0 | 0 | 0 | 1 | ↑FT↓T↑FB | 0x0F |
| 0 | 1 | 1 | 1 | 0 | 0 | 1 | 0 | ↑FT↓T | 0x0F |
| 0 | 1 | 1 | 1 | 0 | 0 | 1 | 1 | ↑FT↓T↓FB | 0x0F |
| 0 | 1 | 1 | 1 | 0 | 1 | 0 | 0 | ↑FT↓T↑B | 0x0F |
| 0 | 1 | 1 | 1 | 0 | 1 | 0 | 1 | ↑FT↓T↑B↑FB | 0x0F |
| 0 | 1 | 1 | 1 | 0 | 1 | 1 | 0 | ↑FT↓T↑B | 0x0F |
| 0 | 1 | 1 | 1 | 0 | 1 | 1 | 1 | ↑FT↓T↑B↓FB | 0x0F |
| 0 | 1 | 1 | 1 | 1 | 0 | 0 | 0 | ↑FT↓T | 0x0F |
| 0 | 1 | 1 | 1 | 1 | 0 | 0 | 1 | ↑FT↓T↑FB | 0x0F |
| 0 | 1 | 1 | 1 | 1 | 0 | 1 | 0 | ↑FT↓T | 0x0F |
| 0 | 1 | 1 | 1 | 1 | 0 | 1 | 1 | ↑FT↓T↓FB | 0x0F |
| 0 | 1 | 1 | 1 | 1 | 1 | 0 | 0 | ↑FT↓T↓B | 0x0F |
| 0 | 1 | 1 | 1 | 1 | 1 | 0 | 1 | ↑FT↓T↓B↑FB | 0x0F |
| 0 | 1 | 1 | 1 | 1 | 1 | 1 | 0 | ↑FT↓T↓B | 0x0F |
| 0 | 1 | 1 | 1 | 1 | 1 | 1 | 1 | ↑FT↓T↓B↓FB | 0x0F |
| 1 | 0 | 0 | 0 | 0 | 0 | 0 | 0 | Flat | 0x0E |
| 1 | 0 | 0 | 0 | 0 | 0 | 0 | 1 | ↑FB | 0x00 |
| 1 | 0 | 0 | 0 | 0 | 0 | 1 | 0 | Flat | 0x0E |
| 1 | 0 | 0 | 0 | 0 | 0 | 1 | 1 | ↓FB | 0x01 |
| 1 | 0 | 0 | 0 | 0 | 1 | 0 | 0 | ↑B | 0x04 |
| 1 | 0 | 0 | 0 | 0 | 1 | 0 | 1 | ↑B↑FB | 0x02 |
| 1 | 0 | 0 | 0 | 0 | 1 | 1 | 0 | ↑B | 0x04 |
| 1 | 0 | 0 | 0 | 0 | 1 | 1 | 1 | ↑B↓FB | 0x0F |
| 1 | 0 | 0 | 0 | 1 | 0 | 0 | 0 | Flat | 0x0E |
| 1 | 0 | 0 | 0 | 1 | 0 | 0 | 1 | ↑FB | 0x00 |
| 1 | 0 | 0 | 0 | 1 | 0 | 1 | 0 | Flat | 0x0E |
| 1 | 0 | 0 | 0 | 1 | 0 | 1 | 1 | ↓FB | 0x01 |

TABLE 1-continued

Row Edge Encoding

Edge Slope States

| dY0>0 1 means falling edge | abs(dY0)>T 1 means strong edge | dY1>0 1 means falling edge | abs(dY1)>T 1 means strong edge | dY2>0 1 means falling edge | abs(dY2)>T 1 means strong edge | dY3>0 1 means falling edge | abs(dY3)>T 1 means strong edge | Edge State Description | Edge State Code |
|---|---|---|---|---|---|---|---|---|---|
| 1 | 0 | 0 | 0 | 1 | 1 | 0 | 0 | ↓B | 0x05 |
| 1 | 0 | 0 | 0 | 1 | 1 | 0 | 1 | ↓B↑FB | 0x0F |
| 1 | 0 | 0 | 0 | 1 | 1 | 1 | 0 | ↓B | 0x05 |
| 1 | 0 | 0 | 0 | 1 | 1 | 1 | 1 | ↓B↓FB | 0x03 |
| 1 | 0 | 0 | 1 | 0 | 0 | 0 | 0 | ↑T | 0x08 |
| 1 | 0 | 0 | 1 | 0 | 0 | 0 | 1 | ↑T↑FB | 0x0F |
| 1 | 0 | 0 | 1 | 0 | 0 | 1 | 0 | ↑T | 0x08 |
| 1 | 0 | 0 | 1 | 0 | 0 | 1 | 1 | ↑T↓FB | 0x0F |
| 1 | 0 | 0 | 1 | 0 | 1 | 0 | 0 | ↑T↑B | 0x06 |
| 1 | 0 | 0 | 1 | 0 | 1 | 0 | 1 | ↑T↑B↑FB | 0x0F |
| 1 | 0 | 0 | 1 | 0 | 1 | 1 | 0 | ↑T↑B | 0x06 |
| 1 | 0 | 0 | 1 | 0 | 1 | 1 | 1 | ↑T↑B↓FB | 0x0F |
| 1 | 0 | 0 | 1 | 1 | 0 | 0 | 0 | ↑T | 0x08 |
| 1 | 0 | 0 | 1 | 1 | 0 | 0 | 1 | ↑T↑FB | 0x0F |
| 1 | 0 | 0 | 1 | 1 | 0 | 1 | 0 | ↑T | 0x08 |
| 1 | 0 | 0 | 1 | 1 | 0 | 1 | 1 | ↑T↓FB | 0x0F |
| 1 | 0 | 0 | 1 | 1 | 1 | 0 | 0 | ↑T↓B | 0x0F |
| 1 | 0 | 0 | 1 | 1 | 1 | 0 | 1 | ↑T↓B↑FB | 0x0F |
| 1 | 0 | 0 | 1 | 1 | 1 | 1 | 0 | ↑T↓B | 0x0F |
| 1 | 0 | 0 | 1 | 1 | 1 | 1 | 1 | ↑T↓B↓FB | 0x0F |
| 1 | 0 | 1 | 0 | 0 | 0 | 0 | 0 | Flat | 0x0E |
| 1 | 0 | 1 | 0 | 0 | 0 | 0 | 1 | ↑FB | 0x00 |
| 1 | 0 | 1 | 0 | 0 | 0 | 1 | 0 | Flat | 0x0E |
| 1 | 0 | 1 | 0 | 0 | 0 | 1 | 1 | ↓FB | 0x01 |
| 1 | 0 | 1 | 0 | 0 | 1 | 0 | 0 | ↑B | 0x04 |
| 1 | 0 | 1 | 0 | 0 | 1 | 0 | 1 | ↑B↑FB | 0x02 |
| 1 | 0 | 1 | 0 | 0 | 1 | 1 | 0 | ↑B | 0x04 |
| 1 | 0 | 1 | 0 | 0 | 1 | 1 | 1 | ↑B↓FB | 0x0F |
| 1 | 0 | 1 | 0 | 1 | 0 | 0 | 0 | Flat | 0x0E |
| 1 | 0 | 1 | 0 | 1 | 0 | 0 | 1 | ↑FB | 0x00 |
| 1 | 0 | 1 | 0 | 1 | 0 | 1 | 0 | Flat | 0x0E |
| 1 | 0 | 1 | 0 | 1 | 0 | 1 | 1 | ↓FB | 0x01 |
| 1 | 0 | 1 | 0 | 1 | 1 | 0 | 0 | ↓B | 0x05 |
| 1 | 0 | 1 | 0 | 1 | 1 | 0 | 1 | ↓B↑FB | 0x0F |
| 1 | 0 | 1 | 0 | 1 | 1 | 1 | 0 | ↓B | 0x05 |
| 1 | 0 | 1 | 0 | 1 | 1 | 1 | 1 | ↓B↓FB | 0x03 |
| 1 | 0 | 1 | 1 | 0 | 0 | 0 | 0 | ↓T | 0x09 |
| 1 | 0 | 1 | 1 | 0 | 0 | 0 | 1 | ↓T↑FB | 0x0F |
| 1 | 0 | 1 | 1 | 0 | 0 | 1 | 0 | ↓T | 0x09 |
| 1 | 0 | 1 | 1 | 0 | 0 | 1 | 1 | ↓T↓FB | 0x0F |
| 1 | 0 | 1 | 1 | 0 | 1 | 0 | 0 | ↓T↑B | 0x0F |
| 1 | 0 | 1 | 1 | 0 | 1 | 0 | 1 | ↓T↑B↑FB | 0x0F |
| 1 | 0 | 1 | 1 | 0 | 1 | 1 | 0 | ↓T↑B | 0x0F |
| 1 | 0 | 1 | 1 | 0 | 1 | 1 | 1 | ↓T↑B↓FB | 0x0F |
| 1 | 0 | 1 | 1 | 1 | 0 | 0 | 0 | ↓T | 0x09 |
| 1 | 0 | 1 | 1 | 1 | 0 | 0 | 1 | ↓T↑FB | 0x0F |
| 1 | 0 | 1 | 1 | 1 | 0 | 1 | 0 | ↓T | 0x09 |
| 1 | 0 | 1 | 1 | 1 | 0 | 1 | 1 | ↓T↓FB | 0x0F |
| 1 | 0 | 1 | 1 | 1 | 1 | 0 | 0 | ↓T↓B | 0x07 |
| 1 | 0 | 1 | 1 | 1 | 1 | 0 | 1 | ↓T↓B↑FB | 0x0F |
| 1 | 0 | 1 | 1 | 1 | 1 | 1 | 0 | ↓T↓B | 0x07 |
| 1 | 0 | 1 | 1 | 1 | 1 | 1 | 1 | ↓T↓B↓FB | 0x0F |
| 1 | 1 | 0 | 0 | 0 | 0 | 0 | 0 | ↓FT | 0x0D |
| 1 | 1 | 0 | 0 | 0 | 0 | 0 | 1 | ↓FT↑FB | 0x0F |
| 1 | 1 | 0 | 0 | 0 | 0 | 1 | 0 | ↓FT | 0x0D |
| 1 | 1 | 0 | 0 | 0 | 0 | 1 | 1 | ↓FT↓FB | 0x0F |
| 1 | 1 | 0 | 0 | 0 | 1 | 0 | 0 | ↓FT↑B | 0x0F |
| 1 | 1 | 0 | 0 | 0 | 1 | 0 | 1 | ↓FT↑B↑FB | 0x0F |
| 1 | 1 | 0 | 0 | 0 | 1 | 1 | 0 | ↓FT↑B | 0x0F |
| 1 | 1 | 0 | 0 | 0 | 1 | 1 | 1 | ↓FT↑B↓FB | 0x0F |
| 1 | 1 | 0 | 0 | 1 | 0 | 0 | 0 | ↓FT | 0x0D |
| 1 | 1 | 0 | 0 | 1 | 0 | 0 | 1 | ↓FT↑FB | 0x0F |
| 1 | 1 | 0 | 0 | 1 | 0 | 1 | 0 | ↓FT | 0x0D |
| 1 | 1 | 0 | 0 | 1 | 0 | 1 | 1 | ↓FT↓FB | 0x0F |
| 1 | 1 | 0 | 0 | 1 | 1 | 0 | 0 | ↓FT↓B | 0x0F |
| 1 | 1 | 0 | 0 | 1 | 1 | 0 | 1 | ↓FT↓B↑FB | 0x0F |
| 1 | 1 | 0 | 0 | 1 | 1 | 1 | 0 | ↓FT↓B | 0x0F |
| 1 | 1 | 0 | 0 | 1 | 1 | 1 | 1 | ↓FT↓B↓FB | 0x0F |
| 1 | 1 | 0 | 1 | 0 | 0 | 0 | 0 | ↓FT↑T | 0x0F |

TABLE 1-continued

Row Edge Encoding

Edge Slope States

| dY0>0 1 means falling edge | abs(dY0)>T 1 means strong edge | dY1>0 1 means falling edge | abs(dY1)>T 1 means strong edge | dY2>0 1 means falling edge | abs(dY2)>T 1 means strong edge | dY3>0 1 means falling edge | abs(dY3)>T 1 means strong edge | Edge State Description | Edge State Code |
|---|---|---|---|---|---|---|---|---|---|
| 1 | 1 | 0 | 1 | 0 | 0 | 0 | 1 | ↓FT↑T↑FB | 0x0F |
| 1 | 1 | 0 | 1 | 0 | 0 | 1 | 0 | ↓FT↑T | 0x0F |
| 1 | 1 | 0 | 1 | 0 | 0 | 1 | 1 | ↓FT↑T↓FB | 0x0F |
| 1 | 1 | 0 | 1 | 0 | 1 | 0 | 0 | ↓FT↑T↑B | 0x0F |
| 1 | 1 | 0 | 1 | 0 | 1 | 0 | 1 | ↓FT↑T↑B↑FB | 0x0F |
| 1 | 1 | 0 | 1 | 0 | 1 | 1 | 0 | ↓FT↑T↑B | 0x0F |
| 1 | 1 | 0 | 1 | 0 | 1 | 1 | 1 | ↓FT↑T↑B↓FB | 0x0F |
| 1 | 1 | 0 | 1 | 1 | 0 | 0 | 0 | ↓FT↑T | 0x0F |
| 1 | 1 | 0 | 1 | 1 | 0 | 0 | 1 | ↓FT↑T↑FB | 0x0F |
| 1 | 1 | 0 | 1 | 1 | 0 | 1 | 0 | ↓FT↑T | 0x0F |
| 1 | 1 | 0 | 1 | 1 | 0 | 1 | 1 | ↓FT↑T↓FB | 0x0F |
| 1 | 1 | 0 | 1 | 1 | 1 | 0 | 0 | ↓FT↑T↓B | 0x0F |
| 1 | 1 | 0 | 1 | 1 | 1 | 0 | 1 | ↓FT↑T↓B↑FB | 0x0F |
| 1 | 1 | 0 | 1 | 1 | 1 | 1 | 0 | ↓FT↑T↓B | 0x0F |
| 1 | 1 | 0 | 1 | 1 | 1 | 1 | 1 | ↓FT↑T↓B↓FB | 0x0F |
| 1 | 1 | 1 | 0 | 0 | 0 | 0 | 0 | ↓FT | 0x0D |
| 1 | 1 | 1 | 0 | 0 | 0 | 0 | 1 | ↓FT↑FB | 0x0F |
| 1 | 1 | 1 | 0 | 0 | 0 | 1 | 0 | ↓FT | 0x0D |
| 1 | 1 | 1 | 0 | 0 | 0 | 1 | 1 | ↓FT↓FB | 0x0F |
| 1 | 1 | 1 | 0 | 0 | 1 | 0 | 0 | ↓FT↑B | 0x0F |
| 1 | 1 | 1 | 0 | 0 | 1 | 0 | 1 | ↓FT↑B↑FB | 0x0F |
| 1 | 1 | 1 | 0 | 0 | 1 | 1 | 0 | ↓FT↑B | 0x0F |
| 1 | 1 | 1 | 0 | 0 | 1 | 1 | 1 | ↓FT↑B↓FB | 0x0F |
| 1 | 1 | 1 | 0 | 1 | 0 | 0 | 0 | ↓FT | 0x0D |
| 1 | 1 | 1 | 0 | 1 | 0 | 0 | 1 | ↓FT↑FB | 0x0F |
| 1 | 1 | 1 | 0 | 1 | 0 | 1 | 0 | ↓FT | 0x0D |
| 1 | 1 | 1 | 0 | 1 | 0 | 1 | 1 | ↓FT↓FB | 0x0F |
| 1 | 1 | 1 | 0 | 1 | 1 | 0 | 0 | ↓FT↓B | 0x0F |
| 1 | 1 | 1 | 0 | 1 | 1 | 0 | 1 | ↓FT↓B↑FB | 0x0F |
| 1 | 1 | 1 | 0 | 1 | 1 | 1 | 0 | ↓FT↓B | 0x0F |
| 1 | 1 | 1 | 0 | 1 | 1 | 1 | 1 | ↓FT↓B↓FB | 0x0F |
| 1 | 1 | 1 | 1 | 0 | 0 | 0 | 0 | ↓FT↓T | 0x0B |
| 1 | 1 | 1 | 1 | 0 | 0 | 0 | 1 | ↓FT↓T↑FB | 0x0F |
| 1 | 1 | 1 | 1 | 0 | 0 | 1 | 0 | ↓FT↓T | 0x0B |
| 1 | 1 | 1 | 1 | 0 | 0 | 1 | 1 | ↓FT↓T↓FB | 0x0F |
| 1 | 1 | 1 | 1 | 0 | 1 | 0 | 0 | ↓FT↓T↑B | 0x0F |
| 1 | 1 | 1 | 1 | 0 | 1 | 0 | 1 | ↓FT↓T↑B↑FB | 0x0F |
| 1 | 1 | 1 | 1 | 0 | 1 | 1 | 0 | ↓FT↓T↑B | 0x0F |
| 1 | 1 | 1 | 1 | 0 | 1 | 1 | 1 | ↓FT↓T↑B↓FB | 0x0F |
| 1 | 1 | 1 | 1 | 1 | 0 | 0 | 0 | ↓FT↓T | 0x0B |
| 1 | 1 | 1 | 1 | 1 | 0 | 0 | 1 | ↓FT↓T↑FB | 0x0F |
| 1 | 1 | 1 | 1 | 1 | 0 | 1 | 0 | ↓FT↓T | 0x0B |
| 1 | 1 | 1 | 1 | 1 | 0 | 1 | 1 | ↓FT↓T↓FB | 0x0F |
| 1 | 1 | 1 | 1 | 1 | 1 | 0 | 0 | ↓FT↓T↓B | 0x0F |
| 1 | 1 | 1 | 1 | 1 | 1 | 0 | 1 | ↓FT↓T↓B↑FB | 0x0F |
| 1 | 1 | 1 | 1 | 1 | 1 | 1 | 0 | ↓FT↓T↓B | 0x0F |
| 1 | 1 | 1 | 1 | 1 | 1 | 1 | 1 | ↓FT↓T↓B↓FB | 0x0F |

TABLE 2

Notation used in Table 1.

| Notation | Meaning |
|---|---|
| FT | Far Top, indicates a significant edge between rows 0 and 1 |
| T | Top, indicates a significant edge between row 1 and 2 |
| B | Bottom, indicates a significant edge between rows 2 and 3 |
| FB | Far Bottom, indicates a significant edge between rows 3 and 4 |
| ↑ | indicates edge slope increases in the direction of increasing row number |
| ↓ | indicates edge slope decreases in the direction of increasing row number |
| Flat | Flat, indicates absence of a significant edge |

To understand the codes used in the table consider the following examples. The edge state description ↑B↑FB having code 0x02 refers to a significant increasing-value edge between rows 2 and 3 and a significant increasing-value edge between rows 3 and 4. ↑T↓B↓FB having code 0x00 refers to a significant increasing edge between rows 1 and 2, a significant decreasing edge between rows 2 and 3, and a significant decreasing edge between rows 3 and 4. Since each of FT, T, B, and FB can be in one of 3 states (increasing, decreasing, not significant), 81 states are possible requiring 7 bits of coding. Practically, not all of these states are important to real edge-identification applications. It has been found that 4 to 6 bits can encode the useful states for most applications. Table 1 above provides a 4-bit example.

As stated above, more than one orientation of vectors may be employed, and the multiple orientation edge-state codes can be mapped at block 655 through an additional encoding process to arrive at an output edge-state code. To understand the multiple orientation aspect of this embodiment of the invention, consider the application of finding a corner pixel. In particular, assume that we wish to indicate that a corner covers pixels $p_{33}$, $p_{34}$, $p_{43}$, $p_{44}$, and the edge identification processor is employing horizontal vectors (rows) and vertical vectors (columns). The definition of the vertical edge states are analogous to the horizontal states, with FL (Far Left), L (Left), Right (Right), FR (Far Right) being analogous to FT, T, B, FB respectively. A corner covering $p_{33}$, $p_{34}$, $p_{43}$, $p_{44}$ would result in the codes for ↑B (0x04) and ↑R (0x04), from the row-edge encoding table and the column edge-encoding table, respectively. When these two codes are received by an encoder for multiple orientations, a code would be generated for the $p_{33}$-$p_{34}$-$p_{43}$-$p_{44}$-type corner. An example of a table for encoding an overall edge state from orientation edge states is given below in Table 3. In this example, the table coverts 4 bits from the horizontal codes and 4 bits from the vertical codes to 8 bits for an overall edge state code. Due to the equality of input and output bits in this example, the table can be rather straightforward, in that we can construct the output as a concatenation of the input bits.

TABLE 3

An example of a table encoding an overall edge state from orientation edge states.

| Horizontal Edge State Code | Vertical Edge State Code | Overall Edge State Code |
|---|---|---|
| 0x00 | 0x00 | 0x00 |
| 0x00 | 0x01 | 0x01 |
| 0x00 | 0x02 | 0x02 |
| 0x00 | 0x03 | 0x03 |
| 0x00 | 0x04 | 0x04 |
| 0x00 | 0x05 | 0x05 |
| 0x00 | 0x06 | 0x06 |
| 0x00 | 0x07 | 0x07 |
| 0x00 | 0x08 | 0x08 |
| 0x00 | 0x09 | 0x09 |
| 0x00 | 0x0A | 0x0A |
| 0x00 | 0x0B | 0x0B |
| 0x00 | 0x0C | 0x0C |
| 0x00 | 0x0D | 0x0D |
| 0x00 | 0x0E | 0x0E |
| 0x00 | 0x0F | 0x0F |
| 0x01 | 0x00 | 0x10 |
| 0x01 | 0x01 | 0x11 |
| 0x01 | 0x02 | 0x12 |
| 0x01 | 0x03 | 0x13 |
| 0x01 | 0x04 | 0x14 |
| 0x01 | 0x05 | 0x15 |
| 0x01 | 0x06 | 0x16 |
| 0x01 | 0x07 | 0x17 |
| 0x01 | 0x08 | 0x18 |
| 0x01 | 0x09 | 0x19 |
| 0x01 | 0x0A | 0x1A |
| 0x01 | 0x0B | 0x1B |
| 0x01 | 0x0C | 0x1C |
| 0x01 | 0x0D | 0x1D |
| 0x01 | 0x0E | 0x1E |
| 0x01 | 0x0F | 0x1F |
| 0x02 | 0x00 | 0x20 |
| 0x02 | 0x01 | 0x21 |
| 0x02 | 0x02 | 0x22 |
| 0x02 | 0x03 | 0x23 |
| 0x02 | 0x04 | 0x24 |
| 0x02 | 0x05 | 0x25 |
| 0x02 | 0x06 | 0x26 |
| 0x02 | 0x07 | 0x27 |
| 0x02 | 0x08 | 0x28 |
| 0x02 | 0x09 | 0x29 |
| 0x02 | 0x0A | 0x2A |
| 0x02 | 0x0B | 0x2B |
| 0x02 | 0x0C | 0x2C |
| 0x02 | 0x0D | 0x2D |
| 0x02 | 0x0E | 0x2E |
| 0x02 | 0x0F | 0x2F |
| 0x03 | 0x00 | 0x30 |
| 0x03 | 0x01 | 0x31 |
| 0x03 | 0x02 | 0x32 |
| 0x03 | 0x03 | 0x33 |
| 0x03 | 0x04 | 0x34 |
| 0x03 | 0x05 | 0x35 |
| 0x03 | 0x06 | 0x36 |
| 0x03 | 0x07 | 0x37 |
| 0x03 | 0x08 | 0x38 |
| 0x03 | 0x09 | 0x39 |
| 0x03 | 0x0A | 0x3A |
| 0x03 | 0x0B | 0x3B |
| 0x03 | 0x0C | 0x3C |
| 0x03 | 0x0D | 0x3D |
| 0x03 | 0x0E | 0x3E |
| 0x03 | 0x0F | 0x3F |
| 0x04 | 0x00 | 0x40 |
| 0x04 | 0x01 | 0x41 |
| 0x04 | 0x02 | 0x42 |
| 0x04 | 0x03 | 0x43 |
| 0x04 | 0x04 | 0x44 |
| 0x04 | 0x05 | 0x45 |
| 0x04 | 0x06 | 0x46 |
| 0x04 | 0x07 | 0x47 |
| 0x04 | 0x08 | 0x48 |
| 0x04 | 0x09 | 0x49 |
| 0x04 | 0x0A | 0x4A |
| 0x04 | 0x0B | 0x4B |
| 0x04 | 0x0C | 0x4C |
| 0x04 | 0x0D | 0x4D |
| 0x04 | 0x0E | 0x4E |
| 0x04 | 0x0F | 0x4F |
| 0x05 | 0x00 | 0x50 |
| 0x05 | 0x01 | 0x51 |
| 0x05 | 0x02 | 0x52 |
| 0x05 | 0x03 | 0x53 |
| 0x05 | 0x04 | 0x54 |
| 0x05 | 0x05 | 0x55 |
| 0x05 | 0x06 | 0x56 |
| 0x05 | 0x07 | 0x57 |
| 0x05 | 0x08 | 0x58 |
| 0x05 | 0x09 | 0x59 |
| 0x05 | 0x0A | 0x5A |
| 0x05 | 0x0B | 0x5B |
| 0x05 | 0x0C | 0x5C |
| 0x05 | 0x0D | 0x5D |
| 0x05 | 0x0E | 0x5E |
| 0x05 | 0x0F | 0x5F |
| 0x06 | 0x00 | 0x60 |
| 0x06 | 0x01 | 0x61 |
| 0x06 | 0x02 | 0x62 |
| 0x06 | 0x03 | 0x63 |
| 0x06 | 0x04 | 0x64 |
| 0x06 | 0x05 | 0x65 |
| 0x06 | 0x06 | 0x66 |
| 0x06 | 0x07 | 0x67 |
| 0x06 | 0x08 | 0x68 |
| 0x06 | 0x09 | 0x69 |
| 0x06 | 0x0A | 0x6A |
| 0x06 | 0x0B | 0x6B |
| 0x06 | 0x0C | 0x6C |
| 0x06 | 0x0D | 0x6D |
| 0x06 | 0x0E | 0x6E |
| 0x06 | 0x0F | 0x6F |
| 0x07 | 0x00 | 0x70 |
| 0x07 | 0x01 | 0x71 |
| 0x07 | 0x02 | 0x72 |
| 0x07 | 0x03 | 0x73 |
| 0x07 | 0x04 | 0x74 |

TABLE 3-continued

An example of a table encoding an overall edge state from orientation edge states.

| Horizontal Edge State Code | Vertical Edge State Code | Overall Edge State Code |
|---|---|---|
| 0x07 | 0x05 | 0x75 |
| 0x07 | 0x06 | 0x76 |
| 0x07 | 0x07 | 0x77 |
| 0x07 | 0x08 | 0x78 |
| 0x07 | 0x09 | 0x79 |
| 0x07 | 0x0A | 0x7A |
| 0x07 | 0x0B | 0x7B |
| 0x07 | 0x0C | 0x7C |
| 0x07 | 0x0D | 0x7D |
| 0x07 | 0x0E | 0x7E |
| 0x07 | 0x0F | 0x7F |
| 0x08 | 0x00 | 0x80 |
| 0x08 | 0x01 | 0x81 |
| 0x08 | 0x02 | 0x82 |
| 0x08 | 0x03 | 0x83 |
| 0x08 | 0x04 | 0x84 |
| 0x08 | 0x05 | 0x85 |
| 0x08 | 0x06 | 0x86 |
| 0x08 | 0x07 | 0x87 |
| 0x08 | 0x08 | 0x88 |
| 0x08 | 0x09 | 0x89 |
| 0x08 | 0x0A | 0x8A |
| 0x08 | 0x0B | 0x8B |
| 0x08 | 0x0C | 0x8C |
| 0x08 | 0x0D | 0x8D |
| 0x08 | 0x0E | 0x8E |
| 0x08 | 0x0F | 0x8F |
| 0x09 | 0x00 | 0x90 |
| 0x09 | 0x01 | 0x91 |
| 0x09 | 0x02 | 0x92 |
| 0x09 | 0x03 | 0x93 |
| 0x09 | 0x04 | 0x94 |
| 0x09 | 0x05 | 0x95 |
| 0x09 | 0x06 | 0x96 |
| 0x09 | 0x07 | 0x97 |
| 0x09 | 0x08 | 0x98 |
| 0x09 | 0x09 | 0x99 |
| 0x09 | 0x0A | 0x9A |
| 0x09 | 0x0B | 0x9B |
| 0x09 | 0x0C | 0x9C |
| 0x09 | 0x0D | 0x9D |
| 0x09 | 0x0E | 0x9E |
| 0x09 | 0x0F | 0x9F |
| 0x0A | 0x00 | 0xA0 |
| 0x0A | 0x01 | 0xA1 |
| 0x0A | 0x02 | 0xA2 |
| 0x0A | 0x03 | 0xA3 |
| 0x0A | 0x04 | 0xA4 |
| 0x0A | 0x05 | 0xA5 |
| 0x0A | 0x06 | 0xA6 |
| 0x0A | 0x07 | 0xA7 |
| 0x0A | 0x08 | 0xA8 |
| 0x0A | 0x09 | 0xA9 |
| 0x0A | 0x0A | 0xAA |
| 0x0A | 0x0B | 0xAB |
| 0x0A | 0x0C | 0xAC |
| 0x0A | 0x0D | 0xAD |
| 0x0A | 0x0E | 0xAE |
| 0x0A | 0x0F | 0xAF |
| 0x0B | 0x00 | 0xB1 |
| 0x0B | 0x02 | 0xB2 |
| 0x0B | 0x03 | 0xB3 |
| 0x0B | 0x04 | 0xB4 |
| 0x0B | 0x05 | 0xB5 |
| 0x0B | 0x06 | 0xB6 |
| 0x0B | 0x07 | 0xB7 |
| 0x0B | 0x08 | 0xB8 |
| 0x0B | 0x09 | 0xB9 |
| 0x0B | 0x0A | 0xBA |
| 0x0B | 0x0B | 0xBB |
| 0x0B | 0x0C | 0xBC |
| 0x0B | 0x0D | 0xBD |
| 0x0B | 0x0E | 0xBE |
| 0x0B | 0x0F | 0xBF |
| 0x0C | 0x00 | 0xC0 |
| 0x0C | 0x01 | 0xC1 |
| 0x0C | 0x02 | 0xC2 |
| 0x0C | 0x03 | 0xC3 |
| 0x0C | 0x04 | 0xC4 |
| 0x0C | 0x05 | 0xC5 |
| 0x0C | 0x06 | 0xC6 |
| 0x0C | 0x07 | 0xC7 |
| 0x0C | 0x08 | 0xC8 |
| 0x0C | 0x09 | 0xC9 |
| 0x0C | 0x0A | 0xCA |
| 0x0C | 0x0B | 0xCB |
| 0x0C | 0x0C | 0xCC |
| 0x0C | 0x0D | 0xCD |
| 0x0C | 0x0E | 0xCE |
| 0x0C | 0x0F | 0xCF |
| 0x0D | 0x00 | 0xD0 |
| 0x0D | 0x01 | 0xD1 |
| 0x0D | 0x02 | 0xD2 |
| 0x0D | 0x03 | 0xD3 |
| 0x0D | 0x04 | 0xD4 |
| 0x0D | 0x05 | 0xD5 |
| 0x0D | 0x06 | 0xD6 |
| 0x0D | 0x07 | 0xD7 |
| 0x0D | 0x08 | 0xD8 |
| 0x0D | 0x09 | 0xD9 |
| 0x0D | 0x0A | 0xDA |
| 0x0D | 0x0B | 0xDB |
| 0x0D | 0x0C | 0xDC |
| 0x0D | 0x0D | 0xDD |
| 0x0D | 0x0E | 0xDE |
| 0x0D | 0x0F | 0xDF |
| 0x0E | 0x00 | 0xE0 |
| 0x0E | 0x01 | 0xE1 |
| 0x0E | 0x02 | 0xE2 |
| 0x0E | 0x03 | 0xE3 |
| 0x0E | 0x04 | 0xE4 |
| 0x0E | 0x05 | 0xE5 |
| 0x0E | 0x06 | 0xE6 |
| 0x0E | 0x07 | 0xE7 |
| 0x0E | 0x08 | 0xE8 |
| 0x0E | 0x09 | 0xE9 |
| 0x0E | 0x0A | 0xEA |
| 0x0E | 0x0B | 0xEB |
| 0x0E | 0x0C | 0xEC |
| 0x0E | 0x0D | 0xED |
| 0x0E | 0x0E | 0xEE |
| 0x0E | 0x0F | 0xEF |
| 0x0F | 0x00 | 0xF0 |
| 0x0F | 0x01 | 0xF1 |
| 0x0F | 0x02 | 0xF2 |
| 0x0F | 0x03 | 0xF3 |
| 0x0F | 0x04 | 0xF4 |
| 0x0F | 0x05 | 0xF5 |
| 0x0F | 0x06 | 0xF6 |
| 0x0F | 0x07 | 0xF7 |
| 0x0F | 0x08 | 0xF8 |
| 0x0F | 0x09 | 0xF9 |
| 0x0F | 0x0A | 0xFA |
| 0x0F | 0x0B | 0xFB |
| 0x0F | 0x0C | 0xFC |
| 0x0F | 0x0D | 0xFD |
| 0x0F | 0x0E | 0xFE |
| 0x0F | 0x0F | 0xFF |

Figure 7:
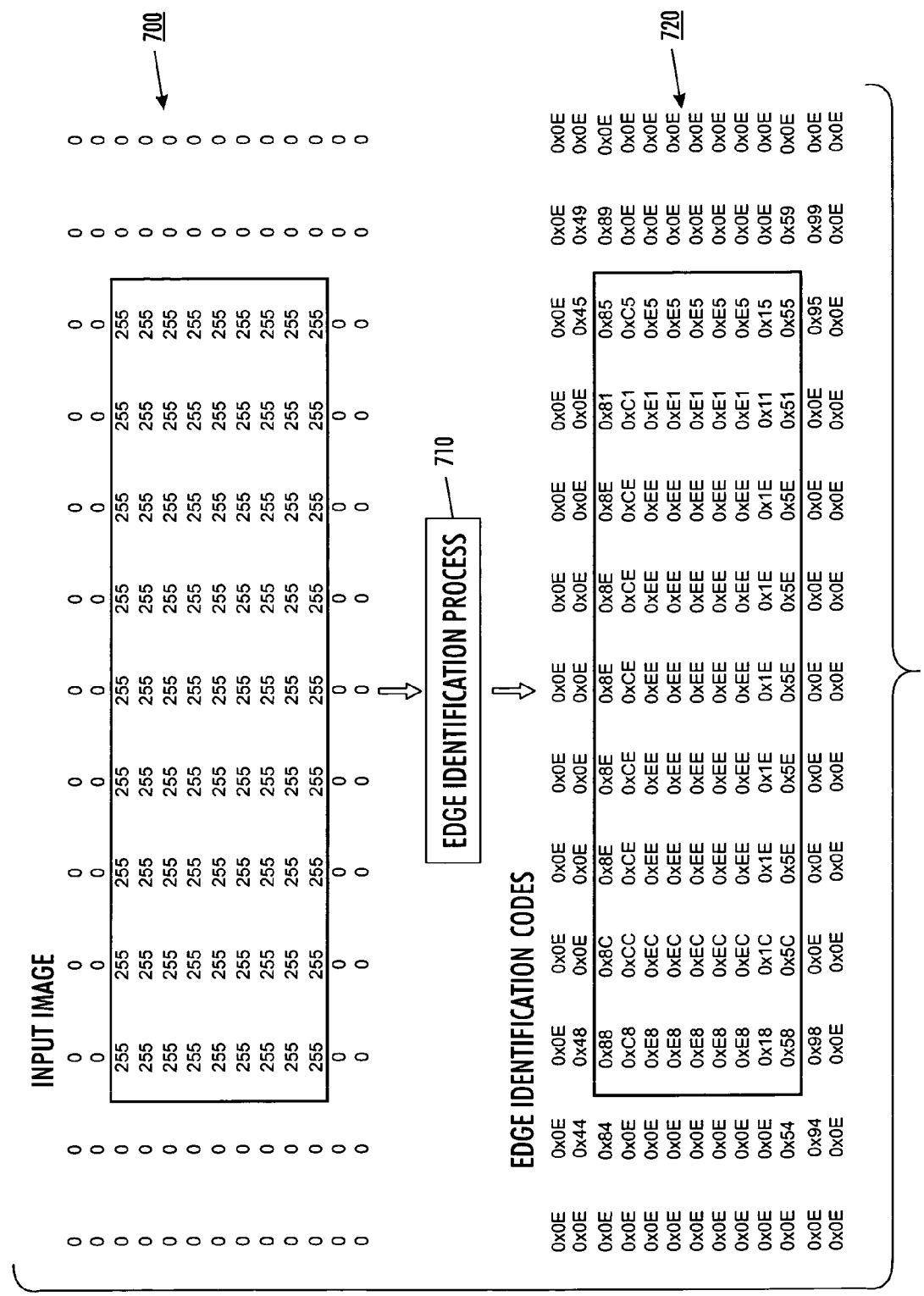
FIG. 7 An exemplary input digital image possessing edges and an array of output edge identification codes according to the teachings presented herein.

FIG. 7 shows an example digital image 700 and a resultant image plane of codes 720 as produced by an edge identification process 710 as diagrammatically illustrated in FIG. 6. The image 700 is a square of pixels each possessing a value of 255 within a field of pixels each possessing a value of 0. The image is input to the edge identification process 710 to produce edge identification codes, each shown in hexadecimal form in the image plane of codes 720. As can be seen in the example, the codes 720 differentiate inside edge, outside edge, vertical edge, horizontal edge, and positions about a corner. This edge information can be used for a variety of purposes, such as image enhancement or recognition.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of processing a digital image to identify edge pixels within the digital image, comprising:
   a) selecting a target pixel location within the digital image;
   b) observing a set of pixels within a pixel observation window superimposed on the digital image, relative to the target pixel location;
   c) generating edge-state codes for a plurality of pairs of neighboring vectors of pixels within the pixel observation window, including,
      (i) generating a sum of weighted pixels values for each of the vectors of pixels of the plurality of pairs of neighboring pixels that run through the pixel observation window,
      (ii) generating sum-to-sum differences for the neighboring pairs of vectors, and
      (iii) encoding the edge-state codes for each pair of the neighboring vectors of pixels; and,
   d) generating edge-identification codes from the plurality of edge-state codes using at least one look-up table so as to thereby identify edge pixels.

2. The method of claim 1, wherein the edge-identification codes indicate at least one of the following: the presence of an edge; the presence of a corner; the absence of an edge; or the absence of a corner.

3. The method of claim 2, wherein encoding of the edge-state codes comprises:
   using one or more bits to encode a magnitude and one bit to encode a sign of the sum-to-sum differences.

4. The method of claim 3 wherein the plurality of vectors are aligned at a first orientation.

5. The method of claim 3 wherein the plurality of vectors are aligned at a plurality of orientations.

6. The method of claim 5 wherein the plurality of orientations is taken from vertical, horizontal, diagonal left, diagonal right.

7. The method of claim 6 wherein each orientation of the plurality of orientations is used to generate an orientated-edge-identification code, and the bits forming the orientated-edge-identification codes are used to form an address into a look-up table that points to the edge identification code.

8. A method for producing edge identification codes from continuous tone digital image data, comprising:
   a) selecting a target pixel location within the continuous tone digital image;
   b) observing a set of pixels within a pixel observation window superimposed on the continuous tone digital image, relative to the target pixel location;
   c) generating sums of weighted pixels values, where the sums are taken over first-orientation vectors of pixels that run through the observation window;
   d) generating sum-to-sum differences for neighboring pairs of said first-orientation vectors of pixels;
   e) generating edge-state codes for each pair of the neighboring first-orientation vectors of pixels by using one or more bits to encode a magnitude and one bit to encode a sign; and,
   f) generating a first-orientation edge identification code by using a plurality of said encoded edge-state codes, where the bits of the edge-state codes are combined to form an index that addresses a first-orientation look-up table that maps multiple encoded edge states to a first-orientation edge identification code.

9. The method of claim 8, wherein the first orientation is one of vertical, horizontal, diagonal left, and diagonal right.

10. The method of claim 8, wherein at least one of the first-orientation edge identification codes within the first-orientation look-up table indicates the presence of an edge within the observation window.

11. The method of claim 8, wherein at least one of the first-orientation edge identification codes within the first-orientation look-up table indicates the non presence of an edge within the observation window.

12. The method of claim 8, wherein at least one of the first-orientation edge identification codes within the first-orientation look-up table indicates the location of an edge within the observation window.

13. The method of claim 8 further comprising:
   a) generating sums of weighted pixels values, where the sums are taken over at least a second-orientation vectors of pixels that run through the observation window;
   b) generating sum-to-sum differences for neighboring pairs of said at least second-orientation vectors of pixels;
   c) deriving edge-state codes for each pair of the neighboring second-orientation vectors of pixels by using one or more bits to encode a magnitude and one bit to encode a sign;
   d) generating a second-orientation edge identification code by using a plurality of said encoded edge-state codes, where the bits of the edge-state codes are combined to form an index that addresses a look-up table that maps multiple encoded edge states to a second-orientation edge identification code; and,
   e) generating an overall edge identification code by using edge identification codes for at least two orientations of vectors, wherein the bits that form the edge identification codes for the at least two orientations of vectors are combined to form an index that is used to address an overall edge identification look-up table that maps a plurality of multiple encoded edge and slope states to an at least second-orientation edge identification code.

14. The method of claim 13, wherein at least one of the overall edge identification codes within the overall edge identification code look-up table indicates the presence of at least one of the following within the observation window: a vertical edge, a horizontal edge, a corner, and no edge.

15. A method for producing edge identification codes from binary digital image data, comprising:
   a) selecting a target pixel location within the binary digital image;
   b) observing a set of pixels within a pixel observation window superimposed on the binary digital image, relative to the target pixel location;
   c) generating edge-state codes for a plurality of pairs of neighboring vectors of pixels within the pixel observation window, including,
      (i) generating a sum of weighted pixels values for each of the vectors of pixels of the plurality of pairs of neighboring pixels that run through the pixel observation window, (ii) generating sum-to-sum differences for the neighboring pairs of vectors, and (iii) encoding the edge-state codes for each pair of the neighboring vectors of pixels; and, d) generating edge-identification codes from the plurality of edge-state codes using at least one look-up table so as to thereby identify edge pixels.

16. The method of claim 15, wherein the edge-identification codes indicate at least one of the following: the presence of an edge; the presence of a corner; the absence of an edge; or the absence of a corner.

17. The method of claim 16, wherein encoding of edge-state codes comprises:

using one or more bits to encode a magnitude and one bit to encode a sign of the sum-to-sum differences.

18. The method of claim 17 wherein the plurality of vectors are aligned at a first orientation.

19. The method of claim 17 wherein the plurality of vectors are aligned at a plurality of orientations.

20. The method of claim 19 wherein the plurality of orientations is taken from vertical, horizontal, diagonal left, diagonal right.

21. The method of claim 20 wherein each orientation of the plurality of orientations is used to generate an orientated-edge-identification code, and the bits forming the orientated-edge-identification codes are used to form an address into a look-up table that points to the edge identification code.

* * * * *